UNITED STATES PATENT OFFICE.

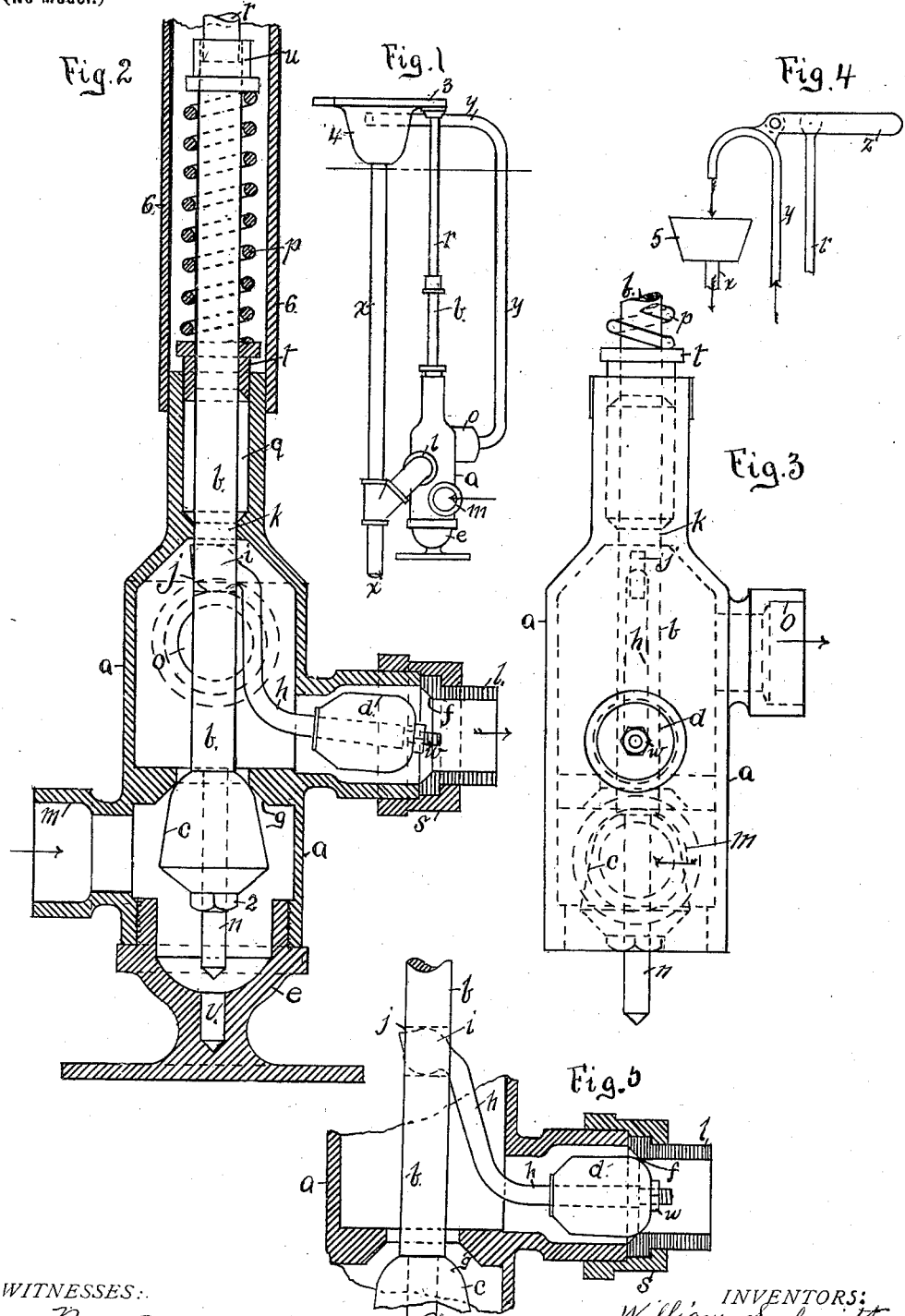

WILLIAM SCHMITT AND DAVID L. McGINNIS, OF PATERSON, NEW JERSEY.

NON-FREEZING VALVE.

SPECIFICATION forming part of Letters Patent No. 656,731, dated August 28, 1900.

Application filed May 3, 1900. Serial No. 15,410. (No model.)

*To all whom it may concern:*

Be it known that we, WILLIAM SCHMITT, residing at No. 458 Main street, and DAVID L. McGINNIS, residing at No. 462 Main street, Paterson, in the county of Passaic and State of New Jersey, have invented a new and useful Improvement in Non-Freezing Valves; and we do hereby declare the following to be a full, clear, and accurate description of the invention, such as will enable others skilled in the art to which it appertains to make and use the same.

Our invention relates to water-valves; and its object is to provide a simple, noiseless, and non-freezing water-valve.

In the accompanying drawings like characters refer to similar parts throughout the several views.

In the accompanying drawings, Figure 1 illustrates the valve in connection with an outside closet. Fig. 2 is a vertical section of the valve. Fig. 3 is another view of the valve with the upper and lower parts left off. Fig. 4 shows an upper appliance for using the valve for an outside hydrant. Fig. 5 is a detail showing the valves the reverse of Fig. 1.

Referring to the drawings, $a$ represents the body of the valve; $m$, the place for the pipe connection to the supply or the reservoir; $o$, for the connection to the delivering-pipe to the closet-bowl or the like, and 1 is the connection to the waste or sewer for the purpose of emptying the chamber.

The body of the valve is in one piece, with the main valve-seat at $g$, and has a base $e$ screwed in the lower part of $a$. The upper part of the body $a$ is smaller in diameter, and at $k$ is a hole the size of the stem $b$. Above this bearing and to the end is a recess $q$, which is used as a stuffing-box. The bushing $t$, screwed in the end of the body $a$, forms the gland for the stuffing-box around the stem $b$. The valve-stem passing through the center of the body of the valve has on its lower end a rubber conic-shaped piece $c$, secured on the stem $b$ between a shoulder and a nut 2. The extreme end $n$ is pointed and when pressed down enters the hole $v$, which acts as a guide, in the base $e$. In the upper part of the body of the valve, above the upper chamber, there is a piece $k$, forming, with the bushing $t$, a space for packing, so as to make a water-tight joint around the stem $b$. In the stem at $j$ there is a rectangular slot passing through the said stem, and at the top of the stem $b$ there is a small flanged piece $u$, which is screwed on. This small piece acts as a coupling, securing the stem to the rod $r$. Said rod passes upward to the closet-seat or to a handle, by which means the valve is operated. Screwed in the upper end of the body of the valve the bushing also supports an open spring $p$, surrounding the stem $b$. The spring presses against the flange of the piece $u$, attached to the stem, thus causing the stem to press upward, causing the rubber cone to tightly close on the seat $g$. Within the upper chamber of the valve there is a bent piece $h$ with a flattened and oval-shaped end, which can move freely in the slot $j$ when the stem is moved up or down. On the other end of this bent piece $h$ there is another piece of rubber $d$, similar to the piece $c$, which is secured on this bent piece $h$ by a nut $w$, holding it to a shoulder on $h$. When the stem $b$ is pressed down, it causes the rubber $d$ to be forced back to the seat $f$, closing it by means of the bent piece $h$, with its oval flattened end $i$ $i$ acting in the slot $j$ in the stem $b$, as shown in Fig. 5. The piece $l$, with the seat $f$, is secured to the main body by the ordinary connection $s$.

To operate the valve, the handle $z$ (shown in Fig. 4) or the seat 3 (shown in Fig. 1) is pressed down, forcing downward the rod $r$ and the stem $b$, opening the valve at $g$, and compressing the spring $p$, which causes the valve to close again when the handle or the seat is released. At the same time that the valve at $g$ is open the valve at $f$ is closed, the water passing through the valve at $g$ into the upper chamber and through the outlet $o$ through the pipe $y$ to the receptacle 4 or 5, the waste passing down the pipe $x$ to the sewer. After using the water and the valve at $g$ is closed by the stem being raised it draws with it the bent piece $h$, and thus opens the valve at $f$ and allows whatever water there is in the upper chamber or in the pipe $y$ to empty into the waste-pipe $x$, and thus leaving no water in the pipes to freeze.

This apparatus is generally placed some feet below the surface of the ground, and if it is necessary to protect it more from cold weather it can be covered with soil, and in this case to protect the spring from the soil it is incased by having a pipe 6 secured to the top of the body of the valve.

The one valve is always open when the other one is closed, and the reverse.

Having thus described our invention, what we claim, and desire to secure by Letters Patent, is—

1. A noiseless, non-freezing, valve consisting of chamber in which there are three waterways, one for receiving, $m$, the other for supplying to closets, &c., $o$, and the third for emptying the chamber, $b$; the valve-seats $g$, and $f$, the stem with the rubber $c$ secured to it, and the piece $h$ with the rubber $d$ secured to it by the nut $w$ as set forth and described in the annexed drawing and specification.

2. In a non-freezing valve the chamber supported by the base $e$, the stem $b$, the piece $h$, and the valve $d$, the slot $j$ in the stem, the space for packing, the gland $t$, the coupling $u$, for the purpose of connecting the stem $b$ and the rod $r$ and forms the connection between the spring $p$ and the stem $b$; the spring $p$ for the purpose of closing the valve at $g$ and opening the valve at $f$, through the connection between the piece $h$ and the slot $j$ in the stem as set forth and described.

3. In a non-freezing valve, the case and valves contained therein, the stem $b$ and the piece $k$ with the rubber pieces $c$ and $d$, the gland, the spring and the incasing pipe 6 for the purpose of protecting the spring and gland, &c., as set forth and described.

4. In a non-freezing valve, the body, the two valves contained therein and the apparatus for opening and closing the same, the base and the incasing pipe 6 in combination with means for operating the said valve in connection with said closet or hydrant, as set forth and described.

Signed at Paterson, in the county of Passaic and State of New Jersey, this 23d day of April, A. D. 1900.

WILLIAM SCHMITT.
DAVID L. McGINNIS.

Witnesses:
CHAS. H. SKELTON,
WALTER D. SNIDER.